(12) United States Patent
Mishra et al.

(10) Patent No.: US 11,648,514 B2
(45) Date of Patent: May 16, 2023

(54) PERFLUOROCARBON-FREE MEMBRANES FOR MEMBRANE DISTILLATION

(71) Applicant: KING ABDULLAH UNIVERSITY OF SCIENCE AND TECHNOLOGY, Thuwal (SA)

(72) Inventors: Himanshu Mishra, Thuwal (SA); Sankara Narayana Moorthi Arunachalam, Thuwal (SA); Eddy M. Domingues, Aveiro (PT); Ratul Das, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 13 days.

(21) Appl. No.: 17/056,809

(22) PCT Filed: May 31, 2019

(86) PCT No.: PCT/IB2019/054548
§ 371 (c)(1),
(2) Date: Nov. 19, 2020

(87) PCT Pub. No.: WO2019/229718
PCT Pub. Date: Dec. 5, 2019

(65) Prior Publication Data
US 2021/0086143 A1    Mar. 25, 2021

Related U.S. Application Data

(60) Provisional application No. 62/781,123, filed on Dec. 18, 2018, provisional application No. 62/678,423, filed on May 31, 2018.

(51) Int. Cl.
*B01D 71/40* (2006.01)
*B01D 67/00* (2006.01)
(Continued)

(52) U.S. Cl.
CPC ......... *B01D 71/40* (2013.01); *B01D 67/0025* (2013.01); *B01D 67/0034* (2013.01);
(Continued)

(58) Field of Classification Search
CPC ................ B01D 71/40; B01D 67/0025; B01D 67/0034; B01D 69/02; B01D 2325/021;
(Continued)

(56) References Cited

U.S. PATENT DOCUMENTS 4,419,242 A * 12/1983 Cheng ..................... B32B 27/08
                                                        210/500.37
6,218,000 B1    4/2001 Rudolf et al.
(Continued)

FOREIGN PATENT DOCUMENTS

DE    102006036863 A1    2/2008

OTHER PUBLICATIONS

Domingues, E.M., et al., "Biomimetic Coating-Free Surfaces for Long-Term Entrapment of Air Under Wetting Liquids," Nature Communications, Sep. 6, 2018, vol. 9, Article No. 3606, 11 pages.
(Continued)

*Primary Examiner* — Krishnan S Menon
(74) *Attorney, Agent, or Firm* — Patent Portfolio Builders PLLC (57) ABSTRACT

A perfluorocarbon-free membrane composed of a non-perfluorocarbon material having a first side and a second side opposite of the first side. The perfluorocarbon-free membrane also includes a plurality of pores, each having an inlet and outlet and each passing through the non-perfluorocarbon material so that each pore provides fluidic communication between the first and second sides of the non-perfluorocarbon material. A portion of the non-perfluorocarbon material extends over the inlet and outlet of each the plurality of pores so that a cross-sectional area of the inlets and outlets
(Continued)

in a direction of the extension of the non-perfluorocarbon material is smaller than a cross-sectional area of the respective pore in the direction of the extension of the non-perfluorocarbon material. The perfluorocarbon-free membrane does not include a hydrophobic perfluorocarbon coating.

19 Claims, 8 Drawing Sheets

(51) Int. Cl.
*B01D 69/02* (2006.01)
*C02F 1/44* (2023.01)
*C02F 103/08* (2006.01)
(52) U.S. Cl.
CPC .............. *B01D 69/02* (2013.01); *C02F 1/447* (2013.01); *B01D 2325/021* (2013.01); *B01D 2325/38* (2013.01); *C02F 2103/08* (2013.01)
(58) Field of Classification Search
CPC ............ B01D 2325/38; B01D 67/0055; B01D 67/0062; B01D 71/021; B01D 61/364; C02F 1/447; C02F 2103/08
See application file for complete search history.

(56) References Cited

U.S. PATENT DOCUMENTS

| | | | |
|---|---|---|---|
| 7,488,421 B2 * | 2/2009 | Hambitzer | ............ C02F 1/447 204/554 |
| 2009/0156426 A1 * | 6/2009 | Schiestel | .......... G01N 33/54353 506/13 |
| 2011/0094884 A1 | 4/2011 | Cotte et al. | |

OTHER PUBLICATIONS

Domingues, E.M., et al., "Doubly Reentrant Cavities Prevent Catastrophic Wetting Transitions on Intrinsically Wetting Surfaces," Applied Materials & Interfaces, Jun. 5, 2017, vol. 9, pp. 21532-21538, American Chemical Society.
International Search Report in corresponding/related International Application No. PCT/IB2019/054548, dated Sep. 30, 2019.
Written Opinion of the International Searching Authority in corresponding/related International Application No. PCT/IB2019/054548, dated Sep. 30, 2019.

* cited by examiner

PERFLUOROCARBON-FREE MEMBRANES FOR MEMBRANE DISTILLATION

CROSS-REFERENCE TO RELATED APPLICATIONS

This application is a U.S. National Stage Application of International Application No. PCT/IB2019/054548, filed on May 31, 2019, which claims priority to U.S. Provisional Patent Application No. 62/678,423, filed on May 31, 2018, entitled "MEMBRANES WITH MUSHROOM-SHAPED (REENTRANT AND DOUBLY REENTRANT) PORES AND THEIR APPLICATIONS IN LIQUID-VAPOR EXTRACTION," and U.S. Provisional Patent Application No. 62/781,123, filed on Dec. 18, 2018, entitled "COATING-FREE GAS ENTRAPPING MEMBRANES (GEMS) FOR DESALINATION," the disclosures of which are incorporated herein by reference in their entirety.

BACKGROUND

Technical Field

Embodiments of the subject matter disclosed herein generally relate to a membranes used for membrane distillation, and more specifically to membranes used for (direct contact, air gap, and vacuum) membrane distillation that include non-perfluorocarbon membrane material and do not include a perfluorocarbon coating.

Discussion of the Background

Membrane distillation (MD) refers to a number of desalination processes in which water vapor is extracted from hot seawater (feed side) through water-repellent membranes and collected on the permeate side. If the permeate side comprises cold deionized water or a mild vacuum, the process is, respectively, known as direct contact membrane distillation (DCMD) or vacuum membrane distillation. To reduce the carbon footprint of desalination, membrane distillation processes could be coupled with low-grade waste heat from industrial and natural sources, making them an active area of research for interdisciplinary materials discovery and process engineering. Membrane distillation requires membranes for the robust separation of the (salty) feed side from the (pure) permeate side to prevent liquid intrusion and to allow only pure water vapor to move to the permeate side. The necessary robustness has only been achieved by membranes with water-repellent chemicals/coatings, for example, made from or coated-with polytetrafluorethylene (PTFE), polyvinylidene difluoride (PVDF), perfluorosilanes, or polystyrene. However, perfluorinated chemicals, which are most commonly used, are expensive, non-biodegradable, and vulnerable to mechanical damage due to abrasion, elevated temperatures, and harsh and frequent cleaning cycles to preempt fouling. Perfluorinated membranes also suffer from the time-dependent degradation of their wetting properties due to the adsorption of amphiphilic contaminants, driven by hydrophobic interactions, leading eventually to liquid intrusion.

Membranes that are free of perfluorocarbons but achieve the same water-repelling functionality as membranes containing perfluorocarbons have thus far not been achieved. Specifically, this water-repelling functionality entails the robust entrapment of air in the pores of the membrane distillation membranes because of their intrinsic water-repellence, which prevents the intrusion of water (or water-based solutions) inside the pores. One possible reason for why this problem has remained unexplored among surface scientists is the conventional wisdom that surface roughness monotonically increases/decreases the wettability of hydrophilic/hydrophobic surfaces—sometimes, referred to as the Wenzel's law, which is given by $\cos \theta_r = r \cos \theta_0$, where r is the surface roughness, defined as the ratio of the real surface area to the projected surface area, and $\theta_r$ and $\theta_0$ are, respectively, the apparent and as-placed contact angles on rough and smooth surfaces, assuming that there is no entrapment of air at the solid-liquid interface. Water is therefore expected to wet (or intrude) the pores of a rough hydrophilic surface/membrane instantaneously, whereas rough hydrophobic surfaces can exhibit superhydrophobicity.

Thus, there is a need for membranes that can be used for membrane distillation that are free of perfluorocarbons and can achieve the water-repelling functions of membranes formed from perfluorocarbon material or having a perfluorocarbon coating.

SUMMARY

According to an embodiment, there is a perfluorocarbon-free membrane, which includes a non-perfluorocarbon material having a first side and a second side opposite of the first side. The perfluorocarbon-free membrane also includes a plurality of pores, each having an inlet and outlet and each passing through the non-perfluorocarbon material so that each pore provides fluidic communication between the first and second sides of the non-perfluorocarbon material. A portion of the non-perfluorocarbon material extends over the inlet and outlet of each the plurality of pores so that a cross-sectional area of the inlets and outlets in a direction of the extension of the non-perfluorocarbon material is smaller than a cross-sectional area of the respective pore in the direction of the extension of the non-perfluorocarbon material. The perfluorocarbon-free membrane does not include a hydrophobic perfluorocarbon coating.

According to an embodiment, there is a membrane distillation method, which involves providing a perfluorocarbon-free membrane. The perfluorocarbon-free membrane includes a non-perfluorocarbon material having a first side and a second side opposite of the first side, and a plurality of pores, each having an inlet and outlet and each passing through the non-perfluorocarbon material so that each pore provides fluidic communication between the first and second sides of the non-perfluorocarbon material. A portion of the non-perfluorocarbon material extends over the inlet and outlet of each the plurality of pores so that a cross-sectional area of the inlets and outlets in a direction of the extension of the non-perfluorocarbon material is smaller than a cross-sectional area of the respective pore in the direction of the extension of the non-perfluorocarbon material. The perfluorocarbon-free membrane does not include a hydrophobic perfluorocarbon coating. The perfluorocarbon-free membrane is arranged so that the first side of the perfluorocarbon-free membrane is exposed to salinated water and the second side of the perfluorocarbon-free membrane is exposed to non-salinated water. The salinated water is warmer than the non-salinated water. Air is entrapped in each of the plurality of pores so that water vapor passes through each of the plurality of pores from the first side to the second side of the perfluorocarbon-free membrane and the salinated water does not pass through the plurality of pores from the first side to the second side of the perfluorocarbon-free membrane.

According to an embodiment, there is a method for forming a perfluorocarbon-free membrane. First and second sheets of non-perfluorocarbon material are provided. Each sheet of non-perfluorocarbon material has a first side and a second side that is opposite the first side. A plurality of cavities are formed in the first and second sheets of non-perfluorocarbon material, each of the plurality of cavities having a bottom on the second side of the respective sheet of the non-perfluorocarbon material. A passageway is formed through the bottom of each of the plurality of cavities and through the second side. The first side of the first sheet non-perfluorocarbon material is joined with the first side of the second sheet of non-perfluorocarbon material to form the perfluorocarbon-free membrane. The perfluorocarbon-free membrane does not include a hydrophobic perfluorocarbon coating.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a membrane used for membrane desalination. However, the membrane can be used in other applications in which it is desired to separate two liquids but allow liquid vapor to pass between the two liquids, for example the concentration of fruit juices and other beverages.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1A:
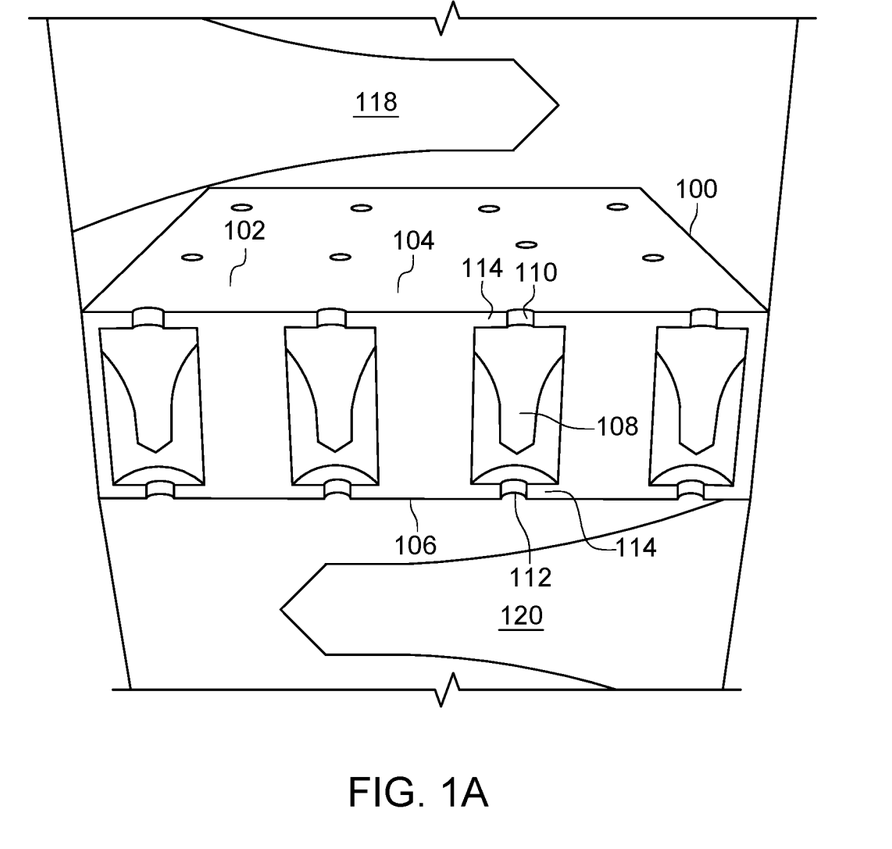
FIG. 1A is a schematic diagram of a perfluorocarbon-free membrane according to embodiments.
Figure 1B:
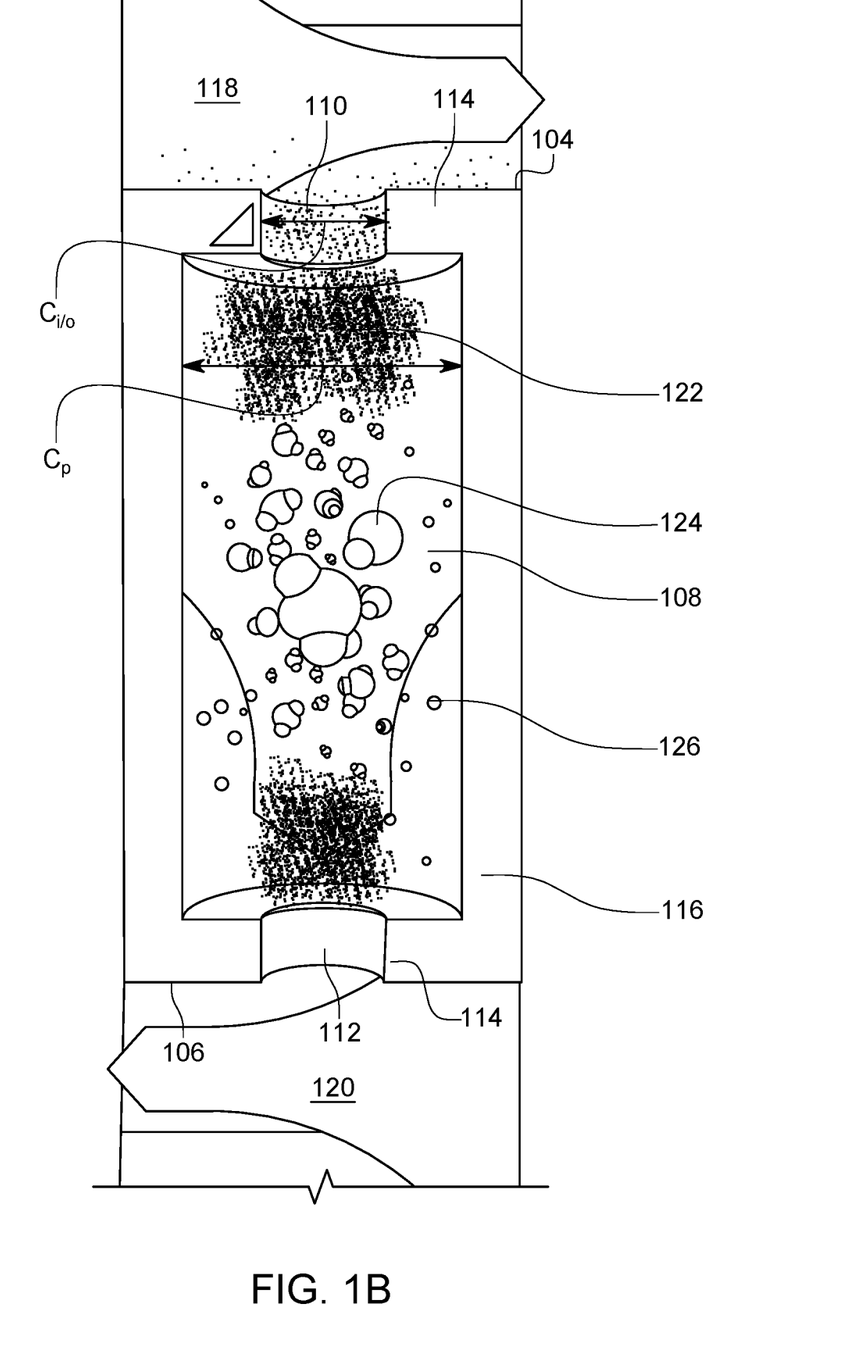
FIG. 1B is a schematic diagram of a perfluorocarbon-free membrane pore according to embodiments.

FIGS. 1A and 1B are schematic diagrams of a perfluorocarbon-free membrane and a perfluorocarbon-free membrane pore, respectively, according to embodiments. The perfluorocarbon-free membrane 100 includes a non-perfluorocarbon material 102 having a first side 104 and a second side 106 opposite of the first side 104. The perfluorocarbon-free membrane 100 also includes a plurality of pores 108 (only one of which is labeled), each having an inlet 110 (only one of which is labeled) and outlet 112 (only one of which is labeled) and each passing through the non-perfluorocarbon material 102 so that each pore 108 provides fluidic communication between the first 104 and second 106 sides of the non-perfluorocarbon material 102. A portion 114 of the non-perfluorocarbon material 102 extends over the inlet 110 and outlet 112 of each the plurality of pores 108 so that a cross-sectional area $C_{i/o}$ of the inlets 110 and outlets 112 in a direction of the extension of the non-perfluorocarbon material 102 is smaller than a cross-sectional area $C_p$ of the respective pore 108 in the direction of the extension 114 of the non-perfluorocarbon material 102. The perfluorocarbon-free membrane 100 does not include a hydrophobic perfluorocarbon coating.

As discussed in more detail below, the particular configuration of the inlet and outlet disclosed (i.e., the non-perfluorocarbon material extending over the inlets and outlets) achieves a water-repellant functionality (i.e., the entrapment of air inside the membrane pores) using a specific surface topography and without depending entirely on the chemistry of the membrane surface. Specifically, the particular configuration of the inlet and outlet disclosed can modify intrinsically hydrophilic materials (i.e., materials intrinsically wetting to water, $\theta_o<90°$) so that they exhibit properties of a hydrophobic material. This is contrary to conventional expectations because hydrophilic materials are intrinsically water wetting and would not be expected to exhibit the necessary hydrophobic behavior required for membrane distillation. Thus, the disclosed configuration allows the use of hydrophilic materials as membranes for membrane distillation without requiring an additional hydrophobic coating, such as a perfluorocarbon coating or any other type of hydrophobic coating. In contrast, it has been conventionally considered that membranes used for membrane distillation must be composed of a hydrophobic material and/or must include a hydrophobic coating. Accordingly, the disclosed membrane does not need to include a perfluorocarbon material or be coated with such a material. It should be noted that the term perfluorocarbon-free membrane does not mean that there are absolutely no perfluorocarbons in the membrane because minute quantities of perfluorocarbons may be unintentionally incorporated into the membrane, for example, during production due to perfluorocarbons being in the atmosphere. Accordingly, a membrane can include minute quantities of perfluorocarbons and still be considered a perfluorocarbon-free membrane.

Figure 2:
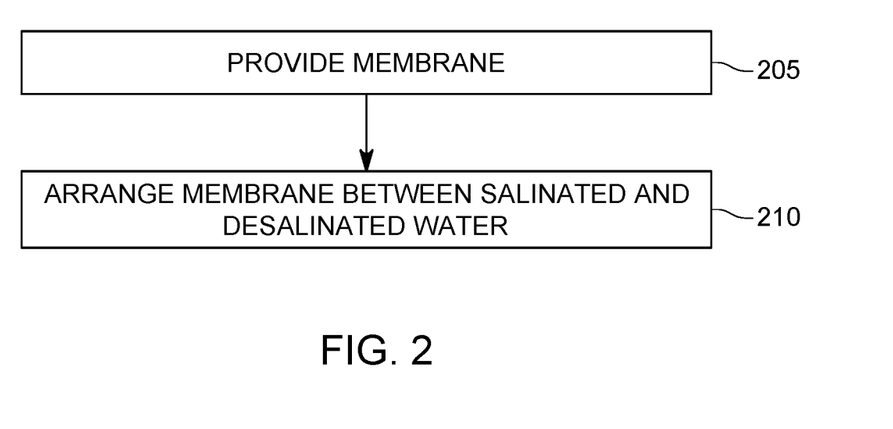
FIG. 2 is a flow diagram of a method for using a perfluorocarbon-free membrane according to embodiments.

A membrane distillation method will now be described in connection with FIG. 2. Initially, a perfluorocarbon-free membrane 100 having the structure described above is provided (step 205). The perfluorocarbon-free membrane 100 is then arranged so that the first side 104 of the perfluorocarbon-free membrane 100 is exposed to salinated water 118 and the second side 106 of the perfluorocarbon-free membrane 100 is exposed to non-salinated water 120 (step 210). The salinated water 118 is warmer than the non-salinated water 120. As used herein, the term "non-salinated water" does not refer to the complete absence of salt in the water but instead refers to water having a level of salt that is low enough so that the water is considered to be safe, potable water for human consumption, for animal consumption, and/or for watering crops. This level of salt would be readily ascertainable by those skilled in the earth. The salinated water 118 can be obtained from any source, such as a salinated lake, sea, or ocean. To the extent that the salinated water 118 is not sufficiently hot to achieve membrane distillation, the salinated water 118 can be heated.

Referring now to FIG. 1B, air is entrapped in each of the plurality of pores 108 so that water vapor 124 passes through each of the plurality of pores 108 from the first side 104 to the second side 106 of the perfluorocarbon-free membrane 100 and the salinated water 118 does not pass through the plurality of pores 108 from the first side 104 to the second side 106 of the perfluorocarbon-free membrane 100. Specifically, water vapor 124 evaporates from the inlet side of the pore 108, condenses 126 on the walls of the pore 108 and the interface with the cooler liquid on the outlet side of the pore 108, and then passes through the outlet of the pore 112 as desalinated water. The perfluorocarbon-free membrane 100 can be arranged in a container so that desalinated water that has passed through the perfluorocarbon-free membrane 100 as water vapor 124 is collected.

Figure 3A:
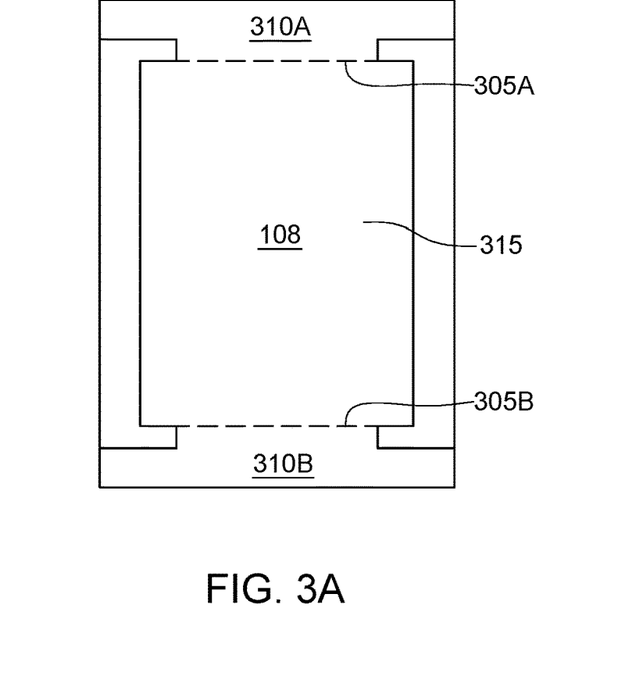
FIG. 3A is a schematic diagram of a perfluorocarbon-free membrane pore having one type of inlet and outlet structure according to embodiments.
Figure 3B:
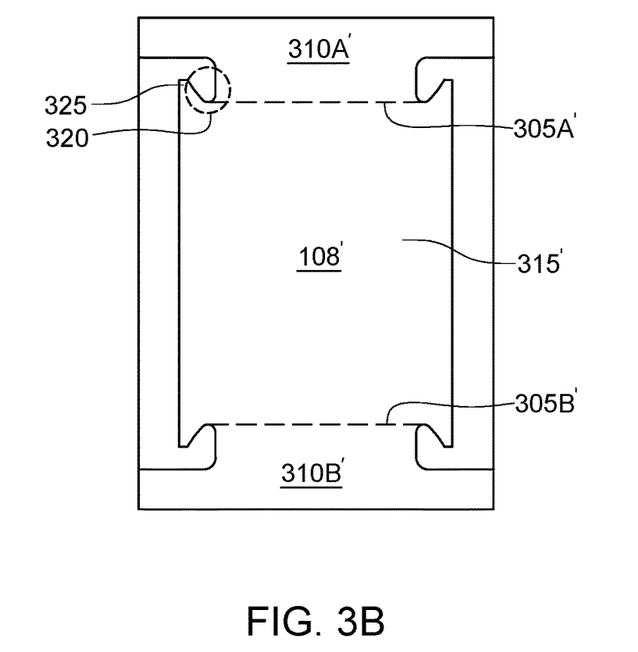
FIG. 3B is a schematic diagram of a perfluorocarbon-free membrane pore having another type of inlet and outlet structure according to embodiments.

The entrapment of air in each of the plurality of pores due to the submersion of the perfluorocarbon-free membrane 100 between salinated and non-salinated water is particularly illustrated in FIGS. 3A and 3B. The pore 108 illustrated in FIG. 3A has the structure of the pores 108 described above in connection with FIGS. 1A and 1B, and the pore structure can be referred to as reentrant, i.e., portions of the perfluorocarbon-free membrane point inward over openings of the pores 108. As illustrated, menisci 305A and 305B are respectively formed by the salinated water 310A and the desalinated water 310B, due to the entrapped air 315 inside of the pore 108.

A similar, but slightly different, pore 108' is illustrated in FIG. 3B. Similar to the pore 108 illustrated in FIG. 3A, menisci 305A' and 305B' are respectively formed by the salinated water 310A' and the desalinated water 310B', due to the entrapped air 315' inside of the pore 108'. The difference between pores 108 and 108' is with respect to the extension of the non-perfluorocarbon material in the inlet and outlet of the pores. Specifically, in FIG. 3A the non-perfluorocarbon material extends perpendicularly to walls of the respective one of the plurality of pores 108, thus forming two inward extensions over the inlet and outlet in the illustrated cross-section. Similarly, in FIG. 3B a portion of the non-perfluorocarbon material extends perpendicularly to walls of the respective one of the plurality of pores 108'. However, in FIG. 3B, an additional portion 320, arranged on an inner periphery of the inlet and outlet, extends into the respective one of the plurality of pores 108'. The additional portion 320 is formed by having a notch 325 in the non-perfluorocarbon material extending perpendicularly to walls of the respective one of the plurality of pores 108'. The inlet and outlet structure illustrated in FIG. 3B can be referred to as doubly-reentrant, i.e., portions of the perfluorocarbon-free membrane point inward over the openings of the pores 108 and additional portions point inward into the openings of the pores 108.

Figure 4:
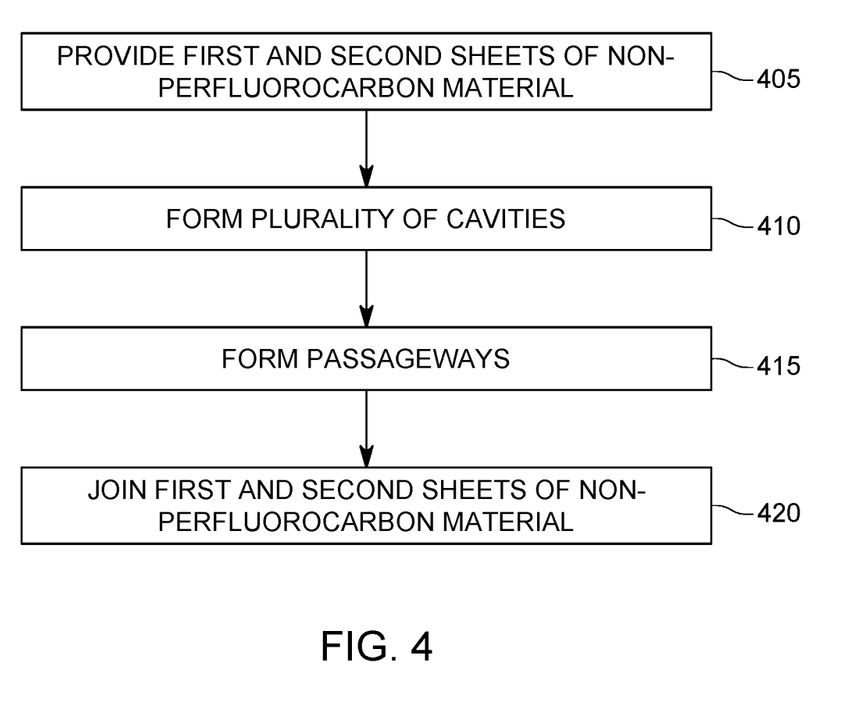
FIG. 4 is a flow diagram of a method for forming a perfluorocarbon-free membrane according to embodiments.
Figure 5A:
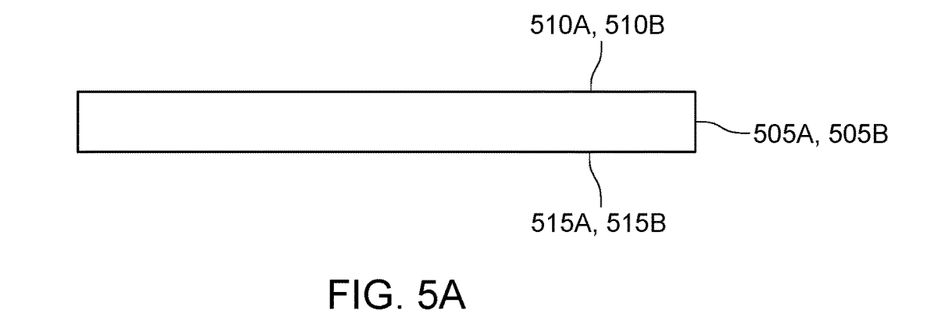
FIGS. 5A-5E are schematic diagrams of a method for forming a perfluorocarbon-free membrane according to embodiments.

A method for forming a perfluorocarbon-free membrane will now be described in connection with FIGS. 4 and 5A-5E. Referring initially to FIGS. 4 and 5A, first 505A and second 505B sheets of non-perfluorocarbon material are provided (step 405). Each sheet 505A and 505B has a first side 510A and 510B, respectively, and a second side 515A and 515B, respectively, that is opposite the first side 510A and 510B. In a non-limiting embodiment, the non-perfluorocarbon material can be poly(methyl methacrylate) (PMMA) and each sheet 505A and 505B can have a thickness of 1.2 mm.

Figure 5B:
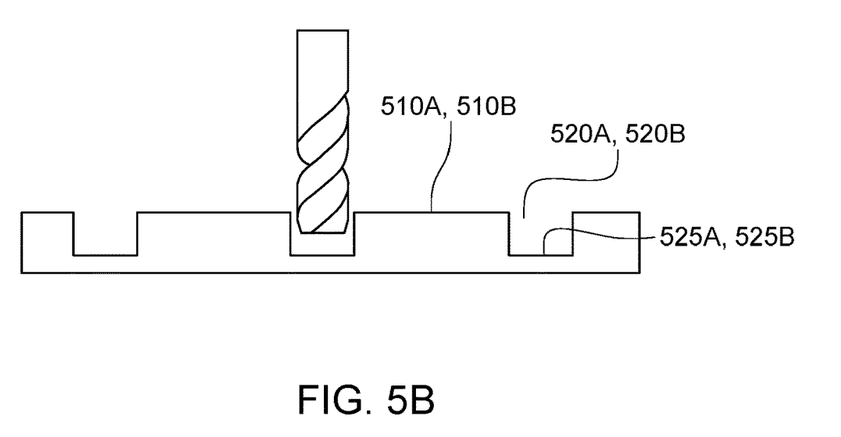

Turning now to FIG. 5B, a plurality of cavities 520A and 520B are formed in the first 505A and second 505B sheets of non-perfluorocarbon material (step 410). In a non-limiting embodiment, the cavities 520A and 520B can have a diameter of 1 mm and a depth of 1 mm and can be formed using a drill that is part of a computerized numeric control (CNC) machine. Although in the illustrated embodiment the cavities 520A and 520B are formed using a drill, these cavities can be formed using other techniques. Each of the plurality of cavities 520A and 520B has a bottom 525A and 525B on the second side 515A and 515B of the respective sheet 505A and 505B of the non-perfluorocarbon material.

Figure 5C:
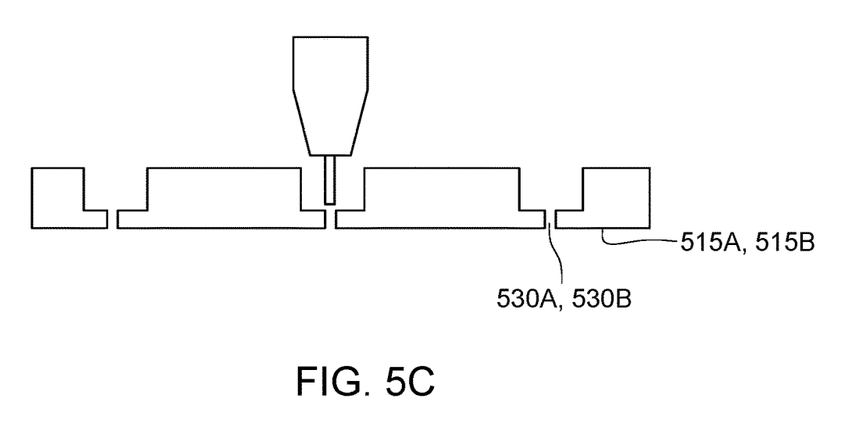

Turning to FIG. 5C, a passageway 530A and 530B is formed through the bottom 525A and 525B of each of the plurality of cavities 520A and 520B and through the second side 515A and 515B (step 415). In a non-limiting embodiment, the diameter of the passageways 530A and 530B can be 16 μm and can be formed using a $CO_2$-laser. Although in the illustrated embodiment the cavities 520A and 520B are formed using a laser, these cavities can be formed using other techniques.

Figure 5D:
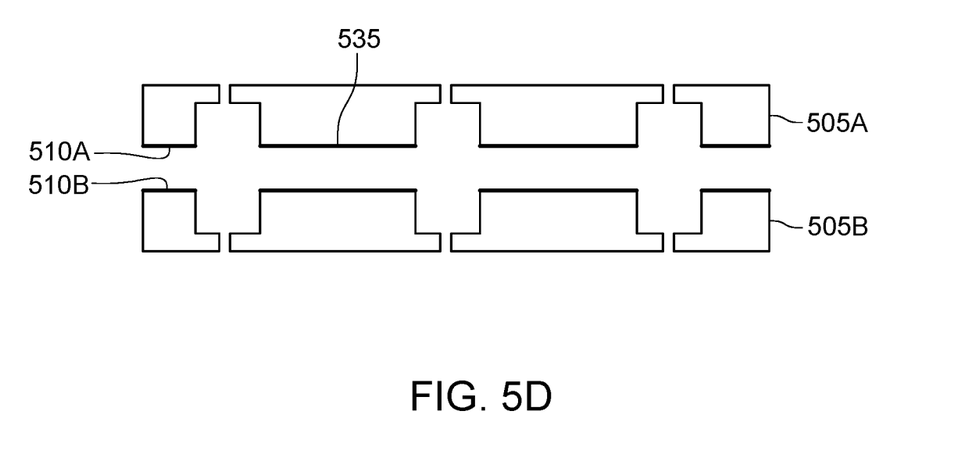
Figure 5E:
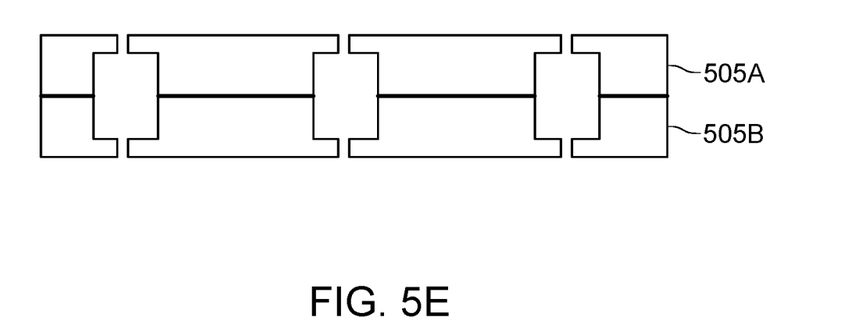

The first side 510A of the first sheet non-perfluorocarbon material 505A is joined with the first side 510B of the second sheet of non-perfluorocarbon material 505B to form the perfluorocarbon-free membrane (step 420). For example, as illustrated in FIG. 5D, an adhesive 535 is applied to the first sides 510A and 510B of the first 505A and second 505B sheets of non-perfluorocarbon material, the two sheets 505A and 505B are aligned, and then, as illustrated in FIG. 5E, the first 505A and second 505B sheets of non-perfluorocarbon material are joined together to form the perfluorocarbon-free membrane. In an embodiment, the adhesive 535 is an ultraviolet light activated adhesive, and thus the joining step would involve exposing the adhesive 535 to ultraviolet light to cure the adhesive 535. It should be recognized, however, that other types of adhesives can be employed.

A perfluorocarbon-free membrane formed in the manner described above was subjected to a number of tests. The porosity, defined as the volume of air trapped in the pores to the total membrane volume, was found to be $\phi=0.08$, which is quite low compared to that of conventional membranes used for membrane distillation. Despite their low porosity, the disclosed perfluorocarbon-free membranes yielded fluxes of desalinated water in the range of 1 $L \cdot m^{-2} \cdot h^{-1}$ for over 12 hours while separating cross-flowing streams of 0.6 M NaCl at T=333 K and deionized water at T=288 K, both flowing at 10 $ml \cdot min^{-1}$. By monitoring the electrical conductivity of the permeate that remained unchanged at 20 μS/cm, it was estimated that the salt rejection was close to 100%. The disclosed perfluorocarbon-free membrane facilitated the robust entrapment of air for over 90 hours under those conditions after which the experiment was discontinued. In contrast, membranes made from PMMA with simple cylindrical pores, i.e., without the extension of the PMMA over the inlet and outlet in the manner disclosed, experienced instant water intrusion upon immersion. These findings unambiguously demonstrate the potential of the disclosed inlet and outlet design in the context of liquid-vapor extraction using membrane distillation.

It should be noted that higher fluxes could be realized by enhancing the perfluorocarbon-free membrane's porosity, choosing materials with even lower thermal conductivity than PMMA, and reducing the length of the pores. Thus, the particular parameters and materials disclosed here can be varied so long as the inlets and outlets are configured as disclosed. Accordingly, although the experimentation involved a PMMA material, other materials can be employed. In other words, the particular configuration of the non-perfluorocarbon material extending over the inlet and outlet in the manner disclosed can modify intrinsically hydrophilic materials so that they exhibit properties of a hydrophobic material. In any event, in order to operate efficiently for membrane distillation, the non-perfluorocarbon should have a thermal conductivity lower than 1 $W \cdot m^{-1} \cdot K^{-1}$.

Figure 6:
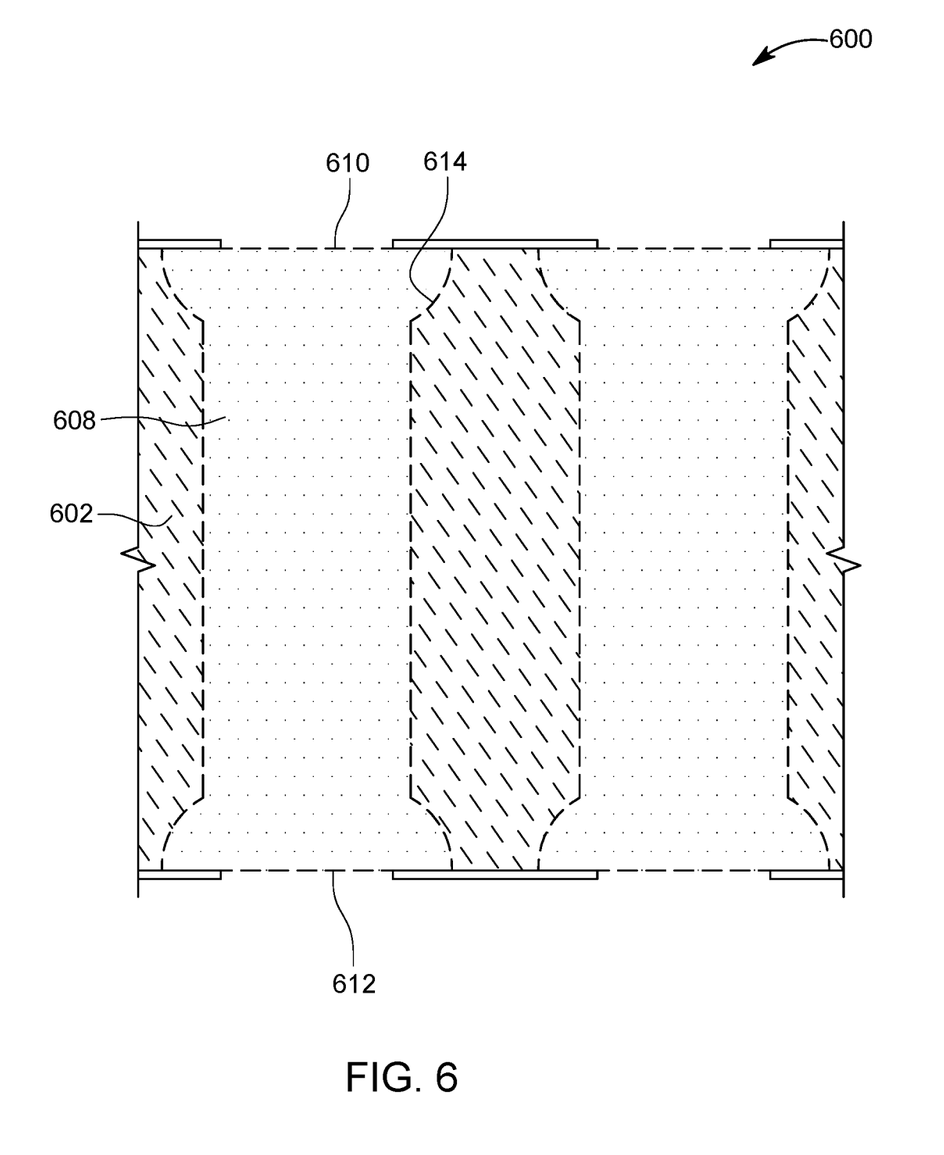
FIG. 6 is schematic diagram of a cross-sectional view of a perfluorocarbon-free membrane according to embodiments.

The perfluorocarbon-free membranes in the embodiments discussed above employed a flexible material, such as a polymer, as the non-perfluorocarbon material. However, a rigid material can be employed as the perfluorocarbon-free membrane as well. Specifically, a perfluorocarbon-free membrane was formed using silicon wafers with a thin layer of silica, a schematic illustration of which is illustrated in FIG. 6. Similar to the perfluorocarbon-free membrane discussed above, the perfluorocarbon-free membrane 600 in FIG. 6 includes a portion of the non-perfluorocarbon material 602 extending over the inlet 610 and outlet 612 of each the plurality of pores 608. Further, there is a concave notch 614 in the non-perfluorocarbon material 602, which notch 614 is formed in the non-perfluorocarbon material 602 just below and above the inlet 610 and outlet 612 respectively. The shape of the pore in the area of the inlets and outlets can be referred to as mushroom-shaped because the concave notches 614 form an open area in the pore that has the shape of a mushroom cap inserted with the top of the cap facing into the pore.

Thus, whereas the perfluorocarbon-free membrane discussed above in connection with FIGS. 1A and 1B has pore walls composed of the non-perfluorocarbon material that intersect the portion of the non-perfluorocarbon material that extends over the pore at an approximately 90° angle so that the cross-sectional area of the pore itself (other than at the inlet and outlet) is approximately the same across the length of the pore, in the embodiment illustrated in FIG. 6 the cross-sectional area of the pore 608 increases as it nears the inlet 610 and outlet 612 due to the concave notches 614. Nonetheless, in the embodiment illustrated in FIG. 6, the cross-sectional area of the inlets 610 and outlets 612 in a direction of the extension of the non-perfluorocarbon material 602 is smaller than a cross-sectional area of the respective pore 608 in the direction of the extension of the non-perfluorocarbon material 602.

Because the perfluorocarbon-free membrane 600 illustrated in FIG. 6 is comprised of silicon, the method for forming it will be different than that described above in connection with the flexible perfluorocarbon-free membrane 100. A non-limiting example of one method that was used for the perfluorocarbon-free membrane 600 in silicon will now be described.

Arrays of pores with mushroom-shaped overhanging features at the inlets and outlets were microfabricated on double-side-polished silicon wafers (p-doped, <100> orientation, 4" diameter and 300 μm thick with 2-μm-thick thermally grown oxide layers on both sides). The wafers were cleaned in a piranha solution, $H_2SO_4:H_2O_2=3:1$ by volume, maintained at T=388 K for 10 min, followed by spin-drying under an $N_2$ environment and exposure to the vapor of hexamethyldisilazane (HMDS) to improve adhesion with the photoresist (AZ-5214E).

A 1.6-μm-thick layer of AZ-5214E, a photoresist, was spin-coated on one side of the wafer (the negative tone of the resist AZ-5214E was used). The desired features of the pore were designed using Tanner EDA L-Edit software and transferred onto a 5-inch soda lime glass mask with 530 nm of photoresist, in a direct-writing system. The features were transferred onto the silicon wafer using a mask alignment system; after UV-exposure, the photoresist was removed using AZ-726 developer.

A magnetron-type DC sputtering source with a post-cathode 0.025 m in diameter and 0.3 m long was used to deposit 50 nm of chromium on the wafer in an argon environment. Current densities were in the range 25-350 $A \cdot m^{-2}$, pressures were in the range 0.15-4 Pa, and a discharge voltage of 400 V was used. The wafer was sputtered for 200 s to obtain a 50-nm-thick chromium layer. The sputtered wafer with chromium was then sonicated in an acetone bath for 5 min to lift off the remaining photoresist, leaving behind the desired features with a chromium hard mask.

The spin coating of the AZ-5214E resist was repeated on the other polished side of the wafer (the negative tone of the resist was used). The desired features were transferred onto this side using the mask alignment system, perfectly aligning its bottom-side microscopes with the features on the top side. After UV exposure, the photoresist was removed using AZ-726 developer.

The chromium hard mask development step, as described above, was repeated.

The exposed $SiO_2$ layer on both sides of the wafer was etched in an inductively coupled plasma (ICP) reactive ion etcher (RIE) (Chamber conditions: 10 mT, RF power: 100 W, ICP power: 1500 W, $C_4F_8$ flow: 40 sccm, and $O_2$ flow: 5 sccm, T=10° C., and t=16 min). A small indentation was created in the silicon layer on both sides via 5 cycles of anisotropic etching using the Bosch process, involving alternating depositions of $C_4F_8$ passivation layers ($C_4F_8$ gas pressure, 30 mT; $C_4F_8$ flow 100 sccm; SF 6 flow: 5 sccm; RF power: 5 W, ICP at 1300 W, T=15° C. for 5 s) and $SF_6$ gas for etching (pressure: 30 mT; RF power 30 W; ICP power: 1300 W; $C_4F_8$ flow: 5 sccm; $SF_6$ flow: 100 sccm; T=15° C. for 7 s). The wafers were then cleaned in a piranha solution, $H_2SO_4: H_2O_2=3:1$ by volume, maintained at T=388 K for 10 min, followed by spin-drying under an $N_2$ environment. This was followed by an isotropic etch of each side ($SF_6$ flow: 110 sccm; 30 mT pressure; RF power 20 W; ICP power: 1800 W; T=15° C. for 2 min 45 sec). The wafers were then transferred to deep-ICP-RIE to etch the Si, 150 μm from each side, using the same recipe as used to create small indentations on the silicon. This led to pores with mushroom-shaped features at the inlets and outlets.

After microfabrication, the samples were cleaned with fresh piranha solution ($H_2SO_4:H_2O_2=3:1$ by volume at T=388 K) for 10 min, blow-dried with a 99% pure $N_2$ pressure gun, and stored in glass petri dishes in a vacuum oven at T=323 K for 48 h.

Silica perfluorocarbon-free membranes constructed in the manner discussed above were subjected to a number of tests regarding their feasibility as a membrane used for membrane distillation, including whether the particular configuration of the inlets and outlets ensured that air would be entrapped in the pores when exposed to fluid on both sides of the perfluorocarbon-free membrane. The wafers were double-side-polished $SiO_2$ (2 μm)/Si (300 μm), which exhibited an intrinsic contact angle for the water/air system of $\theta_o=40°\pm2°$. The design parameters were chosen based on an investigation of the time-dependence of air inside silica cavities with mushroom-shaped inlets that exhibited over eight orders of magnitude longer entrapment compared with simple cylindrical cavities under hexadecane. After iterating the microfabrication process, silica perfluorocarbon-free membranes were formed with vertically-aligned pores with inlet and outlet diameters of D=100 µm, pitches of L=400 µm, mushroom-shaped overhangs of w=18 µm, and lengths of pore, h=300 µm.

To investigate the efficacy of the silica perfluorocarbon-free membranes at entrapping air in the context of membrane distillation, a customized module was constructed for leak-testing silica perfluorocarbon-free membranes, in which the perfluorocarbon-free membrane separated a salty solution (~0.6 M NaCl) from a reservoir containing deionized water at normal temperature and pressure (NTP, T=293 K, P=1 atm). The customized module facilitated in situ monitoring of the electrical conductivity (detection limit: ±0.01 µS/cm) of the deionized water reservoir, allowing the intrusion of water (even pore-level leakage) to be detected through the perfluorocarbon-free membrane. Remarkably, under isothermal conditions, the silica perfluorocarbon-free membranes robustly entrapped air for more than six weeks, after which the experiment was discontinued. In contrast, silica membranes with similar cylindrical pores, but without mushroom-shaped features at pore inlets and outlets, failed instantaneously (i.e., water immediately infiltrated the pores). These results establish that it is possible to prevent the intrusion of water into membranes made from water wetting materials by robustly entrapping air inside the pores using the disclosed biomimetic approach.

Next, using a custom-built setup, the liquid entry pressure (LEP) was measured, which is defined here as the pressure at which the liquid stabilized at the mushroom-shaped inlets/outlets of the pores of the perfluorocarbon-free membranes intrudes inside and touches the pore-walls. Experimentally, it was found that for perfluorocarbon-free membranes with 100 µm inlets, LEP was ≈25 kPa. The LEP was modeled by accounting for the compression of the air entrapped inside the pores by assuming it to be an ideal gas and the 'Laplace pressure' of the curved air-water interface as, $$P_{LEP} = P_2 + \gamma_{LV} \times \left(\frac{1}{R_1} + \frac{1}{R_2}\right)\cos\theta_o \approx 27 \text{ kPa},$$

where $P_1$, $V_1$, and $P_2$ ($P_2=P_1V_1/V_2$), $V_2$ are the pressures and volumes of the air entrapped in the pores, respectively, immediately after immersion in water and just before the intrusion, $\gamma_{LV}$ is the liquid-vapor interfacial tension, $\theta_o$ is the intrinsic contact angle of the as-placed water droplet on a smooth and flat $SiO_2$ surface, and $R_1$, and $R_2$ are the radii of curvatures of the air-water interface before intrusion. The hydrostatic pressure component of the water column of height, l=5 mm ($P_1=\rho gl\approx0.05$ kPa), was ignored. It was noted that significantly higher LEPs can be achieved by reducing the diameter of the pore inlets, for instance, to the nanoscale.

The potential of silica perfluorocarbon-free membranes for desalination was also investigated. Membrane distillation exploits thermal energy to drive the extraction of water vapor from the hot side to the cold side. Thus, in addition to the robust entrapment of air, membranes used for membrane distillation should minimize the loss of heat from the hot to the cold side. To quantify the mass transport of water vapor through the silica perfluorocarbon-free membrane, a module was built that separated 0.6 M NaCl maintained at T=333 K as the surrogate feed from deionized water maintained at T=288 K as the surrogate permeate. Even though the silica perfluorocarbon-free membranes prevented liquid intrusion, the perfluorocarbon-free membranes did not exhibit measurable fluxes due to the high thermal conductivity of silicon ($k=149$ W-m$^{-1}$-K$^{-1}$), which lowered the feed-side temperature and heated the permeate side. In fact, this phenomenon, known as temperature polarization, is well known in the membrane distillation literature and researchers have demonstrated it to be a significant factor in the rational design of membranes for membrane distillation. Attempts to lower the thermal conductivity of the silica perfluorocarbon-free membranes using a conformal coating of a 2 µm-thick layer of poly(p-xylylene) (thermal conductivity of k=0.001 W-m$^{-1}$-K$^{-1}$) did not mitigate the temperature polarization. Therefore, although the silica perfluorocarbon-free membrane may not be suitable for membrane distillation, it can still find use in other processes in which two fluids are to be separated and vapor passing through the pores, such as the study of trapped air in pores using non-volatile liquids, such as hexadecane.

The disclosed embodiments provide a perfluorocarbon-free membrane that can be used for membrane distillation to desalinate water. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A perfluorocarbon-free membrane, comprising:
    a non-perfluorocarbon material having a first side and a second side opposite of the first side, the non-perfluorocarbon material forming a hydrophilic layer; and
    a plurality of pores, each having an inlet and outlet and each passing through the non-perfluorocarbon material so that each pore provides fluidic communication between the first and second sides of the non-perfluorocarbon material,
    wherein a portion of the non-perfluorocarbon material extends over the inlet and outlet of each the plurality of pores so that a cross-sectional area ($C_{i/o}$) of the inlets and outlets in a direction of the extension of the non-perfluorocarbon material is smaller than a cross-sectional area ($C_p$) of the respective pore in the direction of the extension of the non-perfluorocarbon material,
    wherein the perfluorocarbon-free membrane does not include a hydrophobic perfluorocarbon coating, wherein the cross-sectional area ($C_{i/o}$) of the inlets and outlets and the cross-sectional area ($C_p$) of the respective pore extend within the hydrophilic layer, and wherein the non-perfluorocarbon material is a polymer.

2. The perfluorocarbon-free membrane of claim 1, wherein the portion of the non-perfluorocarbon material extending over the inlet and outlet of each the plurality of pores extends perpendicularly to walls of the respective one of the plurality of pores.

3. The perfluorocarbon-free membrane of claim 1, wherein the portion of the non-perfluorocarbon material extending over the inlet and outlet of each of the plurality of pores further comprises a portion extending into the respective one of the plurality of pores.

4. The perfluorocarbon-free membrane of claim 3, wherein the portion extending into the respective one of the plurality of pores is arranged on an inner periphery of the inlet and outlet.

5. The perfluorocarbon-free membrane of claim 1, wherein the membrane does not include any type of hydrophobic coating.

6. The perfluorocarbon-free membrane of claim 1, wherein the non-perfluorocarbon material is a material that is intrinsically wetting to water.

7. The perfluorocarbon-free membrane of claim 1, wherein each of the plurality of pores is cylindrical.

8. The perfluorocarbon-free membrane of claim 6, wherein the polymer is poly(methyl methacrylate) PMMA.

9. The perfluorocarbon-free membrane of claim 1, wherein the non-perfluorocarbon material has a thermal conductivity lower than 1 W-m$^{-1}$-K$^{-1}$.

10. A membrane distillation method, comprising:

providing a perfluorocarbon-free membrane, the perfluorocarbon-free membrane comprising
 a non-perfluorocarbon material having a first side and a second side opposite of the first side, the non-perfluorocarbon material forming a hydrophilic layer; and
 a plurality of pores, each having an inlet and outlet and each passing through the non-perfluorocarbon material so that each pore provides fluidic communication between the first and second sides of the non-perfluorocarbon material,
 wherein a portion of the non-perfluorocarbon material extends over the inlet and outlet of each the plurality of pores so that a cross-sectional area ($C_{i/o}$) of the inlets and outlets in a direction of the extension of the non-perfluorocarbon material is smaller than a cross-sectional area ($C_p$) of the respective pore in the direction of the extension of the non-perfluorocarbon material, wherein the perfluorocarbon-free membrane does not include a hydrophobic perfluorocarbon coating, and
 wherein the cross-sectional area ($C_{i/o}$) of the inlets and outlets and the cross-sectional area ($C_p$) of the respective pore extend within the hydrophilic layer,
arranging the perfluorocarbon-free membrane so that the first side of the perfluorocarbon-free membrane is exposed to salinated water and the second side of the perfluorocarbon-free membrane is exposed to non-salinated water, wherein the salinated water is warmer than the non-salinated water, wherein air is entrapped in each of the plurality of pores so that water vapor passes through each of the plurality of pores from the first side to the second side of the perfluorocarbon-free membrane and the salinated water does not pass through the plurality of pores from the first side to the second side of the perfluorocarbon-free membrane.

11. The membrane distillation method of claim 10, wherein a liquid menisci is formed by the salinated water over the inlet of each of the plurality of pores and a liquid menisci is formed by the non-salinated water over the outlet of each of the plurality of pores.

12. The membrane distillation method of claim 10, further comprising:

obtaining the salinated water from a lake, sea, or ocean.

13. The membrane distillation method of claim 10, further comprising:

collecting desalinated water that has passed through the perfluorocarbon-free membrane as water vapor and condensed on the cold side.

14. The membrane distillation method of claim 10, further comprising:

heating the salinated water.

15. A method for forming a perfluorocarbon-free membrane, the method comprising:

providing first and second sheets of non-perfluorocarbon material, each having a first side and a second side that is opposite the first side;

forming a plurality of cavities in the first and second sheets of non-perfluorocarbon material, each of the plurality of cavities having a bottom on the second side of the respective sheet of the non-perfluorocarbon material;

forming a passageway through the bottom of each of the plurality of cavities and through the second side; and joining the first side of the first sheet non-perfluorocarbon material with the first side of the second sheet of non-perfluorocarbon material to form the perfluorocarbon- free membrane, wherein the perfluorocarbon-free membrane does not include a hydrophobic perfluorocarbon coating.

16. The method of claim 15, wherein the plurality of cavities are formed by drilling.

17. The method of claim 16, wherein the passageway is formed through the bottom of each of the plurality of cavities by a laser.

18. The method of claim 15, further comprising:

applying an adhesive to the first sides of the first and second sheets of non- perfluorocarbon material prior to joining the first and second sheets of non- perfluorocarbon material to each other.

19. The method of claim 18, further comprising:

exposing joined first and second sheets of non-perfluorocarbon material to ultraviolet let to activate the adhesive.

* * * * *